United States Patent

Hara et al.

[11] Patent Number: 6,053,815
[45] Date of Patent: Apr. 25, 2000

[54] GAME DEVICE AND METHOD FOR REALISTIC VEHICLE SIMULATION IN MULTIPLE DIMENSIONS

[75] Inventors: Yoshiteru Hara; Shingo Yasumaru; Mizuki Itoh; Kazuhide Arai; Keiichi Fujisawa; Nobuyuki Takano; Makoto Minematsu, all of Tokyo, Japan

[73] Assignee: Kabushiki Kaisha Sega Enterprises, Tokyo, Japan

[21] Appl. No.: 08/936,539

[22] Filed: Sep. 24, 1997

[30] Foreign Application Priority Data

Sep. 27, 1996 [JP] Japan .................................. 8-257112
Aug. 29, 1997 [JP] Japan .................................. 9-233706

[51] Int. Cl.[7] .................................................. A63F 9/00
[52] U.S. Cl. .................................. 463/46; 463/6; 434/66; 434/69
[58] Field of Search ................................ 463/6, 58, 59, 463/62, 63; 434/69, 68, 67, 66, 61

[56] References Cited

U.S. PATENT DOCUMENTS

| | | | |
|---|---|---|---|
| 5,209,662 | 5/1993 | Fujita et al. | 434/61 |
| 5,269,687 | 12/1993 | Mott et al. | 434/69 |
| 5,299,810 | 4/1994 | Pierce et al. | 434/69 |
| 5,368,484 | 11/1994 | Copperman et al. | 434/69 |
| 5,707,237 | 1/1998 | Takemoto et al. | 463/6 |

Primary Examiner—Jessica J. Harrison
Assistant Examiner—Sheila Clayton
Attorney, Agent, or Firm—Finnegan, Henderson, Farabow, Garrett & Dunner, L.L.P.

[57] ABSTRACT

A game device and method for simulating the motion of an object such as a vehicle in a realistic manner, thereby allowing the operator to sense highly realistic motions of the object in at least one dimension. In one aspect of the invention, the game device includes a vehicle simulator for an operator to ride and drive; a motion control mechanism for moving the vehicle simulator; a storage means for retaining a plurality of control data for moving the vehicle simulator in various patterns by assigning the control data respectively to a plurality of flag signals; a basic control means for setting a flag signal which corresponds to an event occurring in accordance with the development of a game by the operator; and a motion control means for reading from the storage means the control data corresponding to the flag signal which has been set, and for giving the control data to the motion control mechanism. In addition, the motion control means, upon the coexistence of the flag signals, synthesizes a plurality of control data, which correspond to the respective flag signals, and gives the synthesized control data to the motion control mechanism.

12 Claims, 16 Drawing Sheets

Velocity at Center of Gravity Vx, Vy, Vz
Position of Center of Gravity Px, Py, Pz

FIG. 7

Motion Table List

| Code | Flag Name | Number of Frames | Content |
|---|---|---|---|
| A00 | ACC_L | 180 | Acceleration Large |
| A01 | ACC_S | 120 | Acceleration Small |
| A02 | BRK | 120 | Deceleration |
| A03 | L_CURV_L | 180 | Left Curve, Sideslip Large |
| A04 | L_CURV_S | 60 | Left Curve, Sideslip Small |
| A05 | R_CURV_L | 180 | Right Curve, Sideslip Large |
| A06 | R_CURV_S | 60 | Right Curve, Sideslip Small |
| A07 | JUMP_UP | 120 | Jump Up |
| A08 | | | |
| A09 | L_ROLL | 120 | Left Bank |
| A10 | R_ROLL | 120 | Right Bank |
| A11 | L_CURV_M | 120 | Left Curve, Sideslip Medium |
| A12 | L_CURV_M | 120 | Right Curve, Sideslip Medium |
| 13 | | | Center Position (every 16ms) |
| 14 | | | End (HOME) |
| 15 | | | Test (NO MOVE) |
| | | | |
| B00 | F_BAN_L | 60 | Front Collision Large |
| B01 | FR_BAN_S | 60 | Front and Back Collision Small |
| B02 | L_BAN_L | 60 | Left Collision Large |
| B03 | L_BAN_S | 60 | Left Collision Small |
| B04 | R_BAN_L | 60 | Right Collision Large |
| B05 | R_BAN_S | 60 | Right Collision Small |
| B06 | JUMP_DWN | 60 | Jump Down |
| 07 | | | Center Position (every 16ms) |
| | | | |
| C00 | NOISE | 180 | Road Noise (16ms) |
| 01 | | | Center Position (every 16ms) |

FIG.10(a) A00 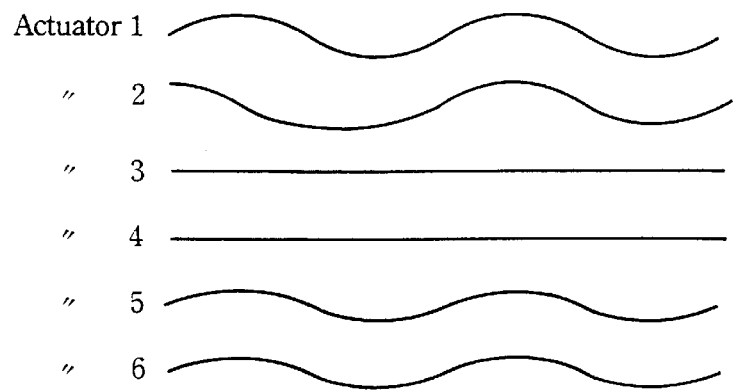
FIG.10(b) B02 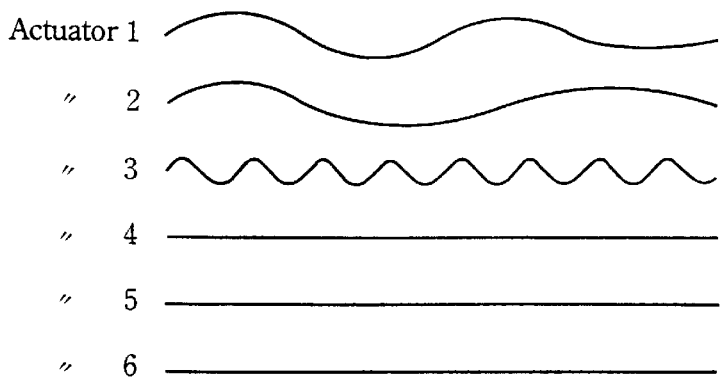
FIG.10(c) C03 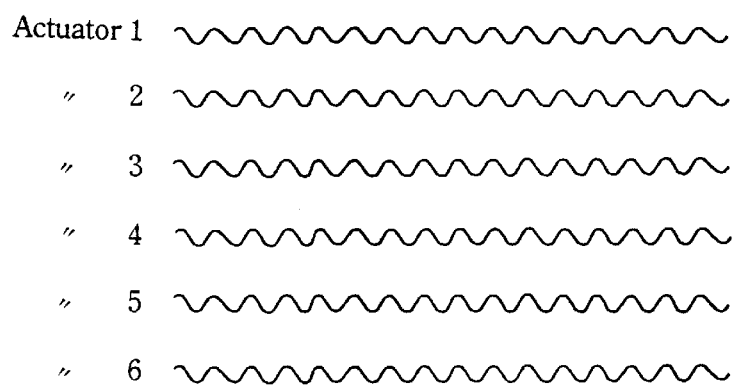

Synthesis Output

GAME DEVICE AND METHOD FOR REALISTIC VEHICLE SIMULATION IN MULTIPLE DIMENSIONS

BACKGROUND OF THE INVENTION

1. Field of the Invention

The present invention relates to a game device. More particularly, this invention relates to a simulation game device which allows a person to ride a dummy body as an operator of the dummy body. For example, the dummy body is a car, an aircraft or the like and is used to enjoy a car race, an air battle etc.

DESCRIPTION OF THE RELATED ART

In this type of simulation game device, there are conventional game devices which allow a driver to ride a dummy car and attend a car race or rally as he/she watches a game screen. When the driver selects a course and starts a game, a program which has been previously incorporated according to a route makes the game proceed and various events such as a collision, jump or slip of the car take place. Movements of the dummy car are controlled in accordance with the events. For example, as shown in FIG. 17, as the car proceeds, events p1, p2, p3, p4, etc. such as a collision, sideslip or jump take place. Control data P1, P2, P3, etc. about the movements of the dummy car, which have been previously prepared so as to correspond to the events p1, p2, p3, etc., are read from a memory table and are then given to a control mechanism of the dummy car. Consequently, the dummy car shows the movements such as a collision, acceleration or slip and gives realistic excitement to the driver.

However, according to the above-mentioned control of the movements of the car, a series of control data which show the previously stored movements of the car are executed in order (or in serial order) in accordance with the order of occurrence of the events. Accordingly, only after the execution of all the control data concerning one movement is finished, control data of the next movement can be executed. Therefore, if events occur in a concentrated manner in a short period of time, the movements of the dummy car may demonstrate a tendency to become slower than the current situation displayed on a screen. Moreover, at some point, the execution is limited to only one of the control data. Accordingly, all the movements of the dummy car at the relevant event must be stored in one control data and no consideration is given to a game development where a plurality of events coexist.

This may result in a tendency to cause the synchronization of the content of the screen with the movement of the dummy car during a game to be performed incompletely and to cause the movement patterns of the dummy car to lack in variety. In such a situation, an expensive motion mechanism which drives the dummy car cannot be fully utilized for games.

On the other hand, so-called real-time simulation technique which attempts to execute complicated algorithm and an enormous amount of arithmetic processing in a short time and to reproduce the same movements as those of a real aircraft as much as possible is applied to a simulator of, for example, an aircraft. It is technically difficult to apply, without any modifications, a full-scale real-time simulation which requires a large amount of information processing to a game device for a driving game, which is comparatively inexpensive and, therefore, uses CPU with a relatively low capacity. Even if a game device reproduces the movements of a dummy aircraft (of a dummy car) very close to those of a real aircraft (or a real car), this will not present sufficient entertainment as a game. In a simulation game, it would be more entertaining and would give a driver a realistic excitement if a dummy body demonstrates predetermined movements with an entertaining taste in accordance with the situation.

SUMMARY OF THE INVENTION

For the purpose of solving the above-described problems, it is an object of the present invention to provide a game device which causes the behavior of a dummy body, or vehicle simulator, such as a dummy car to conform to the development of a story and which is capable of easily realizing various movements of the dummy body, thereby allowing an operator to sense the highly realistic movements of the car body.

In order to attain the above-described object, a game device of this invention comprises: a dummy body (or an object) for an operator to ride and drive; a motion control mechanism for moving the dummy body; a storage means for retaining a plurality of control data for moving the dummy body in various patterns by assigning the control data respectively to a plurality of flag signals; a basic control means for setting a flag signal which corresponds to an event occurring in accordance with the development of a game by the operator; and a motion control means for reading from the storage means the control data corresponding to the flag signal which has been set, and for giving the control data to the motion control mechanism. The motion control means, upon the coexistence of the flag signals, synthesizes a plurality of control data, which correspond to the respective flag signals, and gives the synthesized control data to the control mechanism.

According to such construction, upon the coexistence of flags, control data in a table format are synthesized and, therefore, it becomes possible to control the dummy body in accordance with the occurrence of a plurality of events and to enjoy a more realistic simulation game with a good response.

As control data are classified by considering, for example, events which will not occur simultaneously, causes of occurrence of events, movements of the dummy body itself and movements caused from outside to the dummy body, it is possible to make the control data easily accessible.

A plurality of control data to be synthesized are generated only in the amount equal to the number of a plurality of actuators for driving a dummy body.

The synthesis of control data is repeated in predetermined cycles and the synthesized data is converted into analog signals by DAC.

Another invention is a method of controlling a control device for controlling the movements of a dummy body (or object) with a simulation game device designed to allow an operator to ride the dummy body and drive it in accordance with a story developed on a screen and to control the movements of the dummy body on the basis of the drive by the operator and the development of the story. Every time an event occurs in accordance with the development of the story, control data corresponding to the event is selected from plural kinds of control data with determined patterns to move the dummy body and is given to the control device. If a plurality of events occur and if a plurality of control data to be given to the control device exist simultaneously, the plurality of control data are synthesized and the obtained synthesized control data are given to the control device.

Accordingly, it is possible to perform the control in a parallel and sequential processing manner in conformity to the occurrence of plural events by using CPU which executes one operational routine at once.

A motion control mechanism of this invention comprises: an upper frame (302) and a lower frame (301), respectively located at an upper position and a lower position so as to be in parallel to each other; a rotary ring (303) mounted on the lower frame (301) and being rotatable on a rotary core (304) which is an axis perpendicular to a principal plane of the lower frame (301); a universal joint (305) for supporting the upper frame (301) in a freely shakable manner, the universal joint being mounted between a nearly central portion (304) of the rotary ring (303) and the upper frame (301); a first actuator (306) for rotating the rotary ring (303), the first actuator being mounted between the rotary ring (303) and the lower frame (301); and second and third actuators (307, 308) respectively mounted between the rotary ring (303) and the upper frame (302) so as to hold the rotary core (304) in between.

The first actuator (306) gives a yaw motion to the upper frame (302), and the second and third actuators (307, 308) give a roll and pitch motion to the upper frame (302).

Such a construction makes it possible to obtain a motion control mechanism of three-axial control (roll, pitch and yaw) in a comparatively simple construction.

The information storage medium according to the present invention stores a program to cause a computer system to operate as the game device.

A information storage medium which stores a program for executing the method of controlling a simulation game device.

BRIEF DESCRIPTION OF THE DRAWINGS

FIG. 7 shows an example of a motion table.

FIGS. 10(a)–10(c) show actuator data examples corresponding to flags.

DETAILED DESCRIPTION OF THE INVENTION

Embodiments of the present invention are hereinafter explained with reference to drawings.

Figure 1:
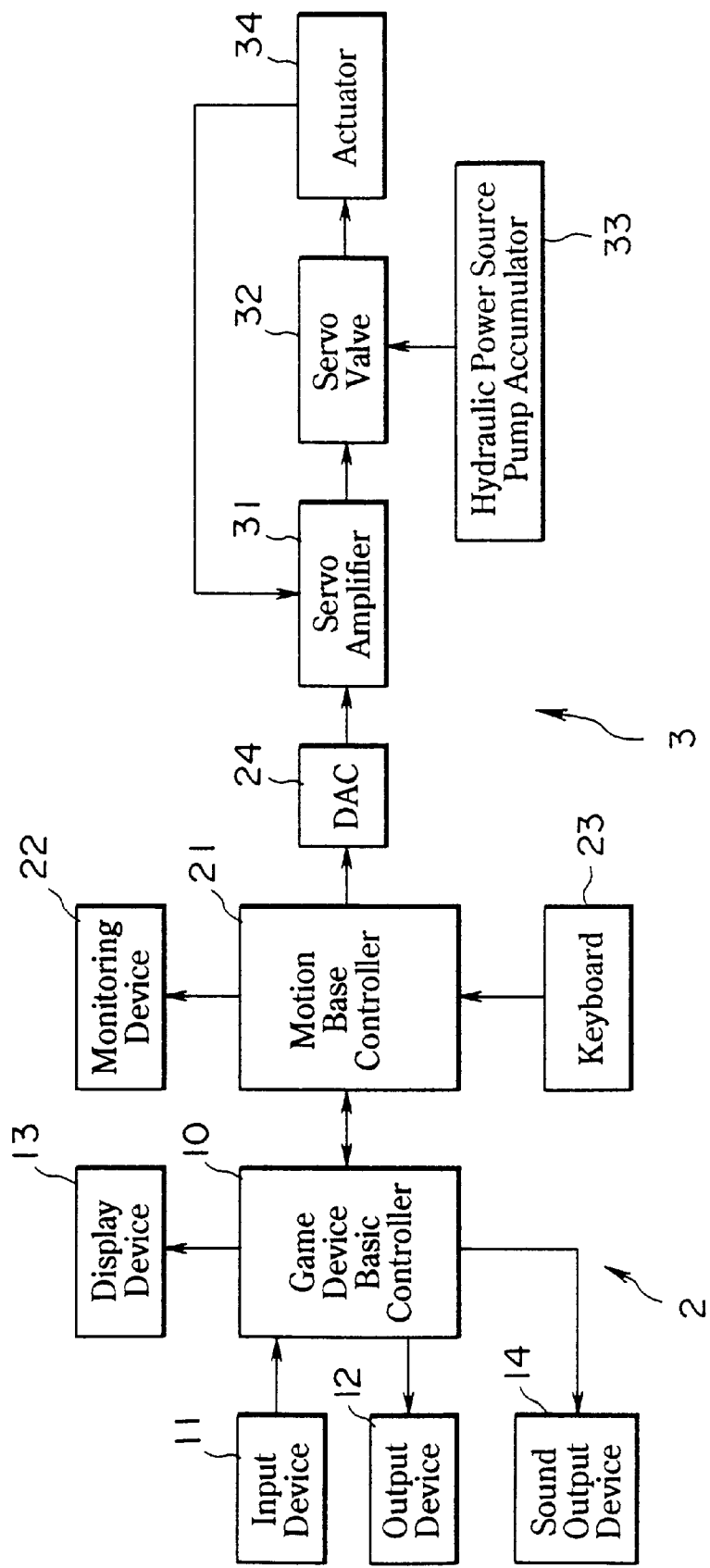
FIG. 1 is a block diagram showing the entire control system of the present invention.
Figure 2:
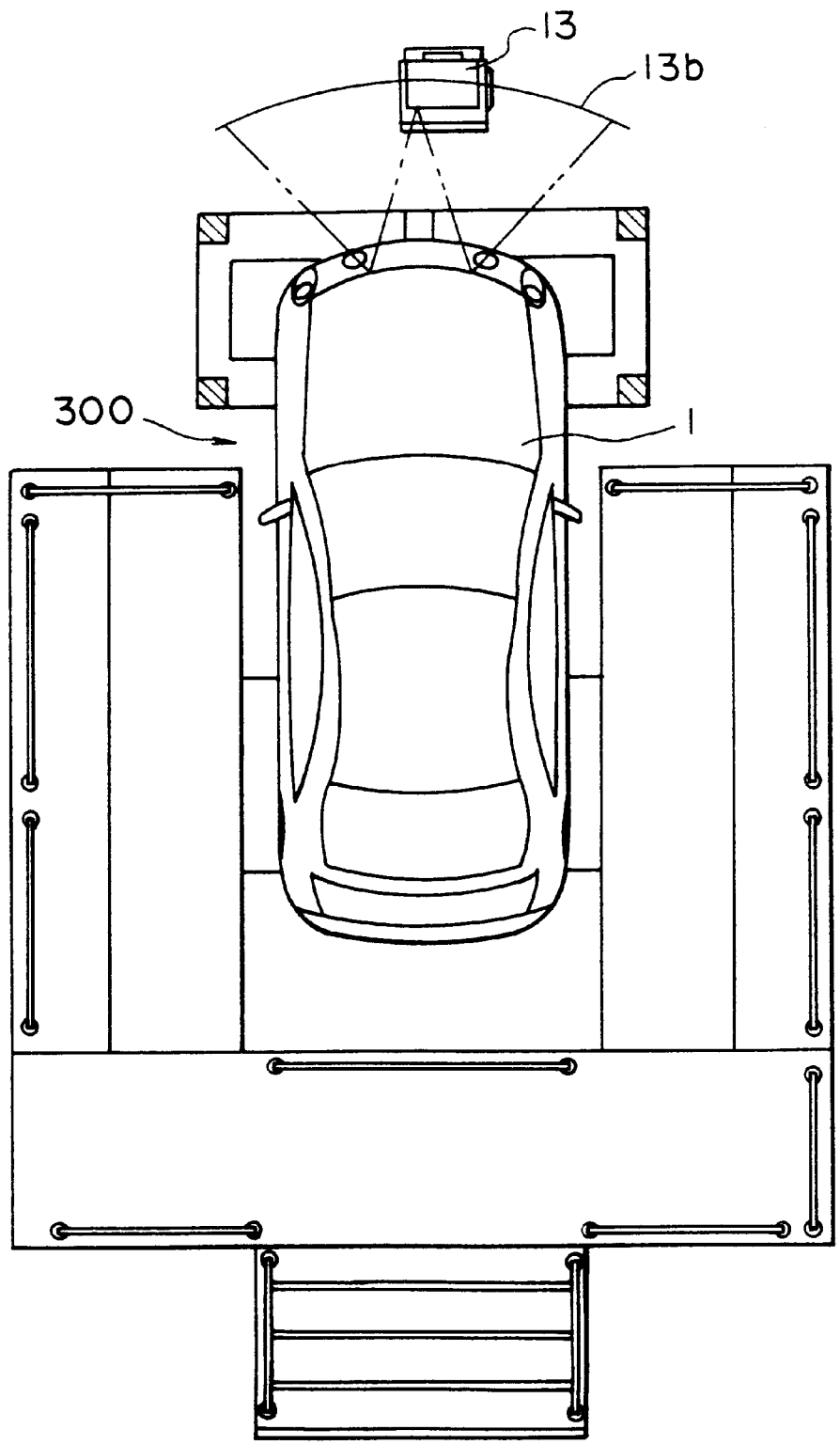
FIG. 2 is a top view of a motion control mechanism which controls the motions of a car body (dummy body).
Figure 3:
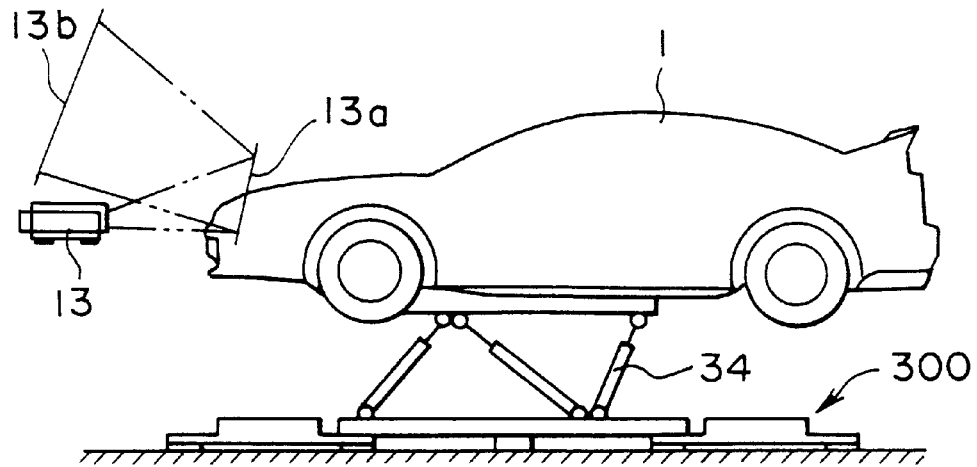
FIG. 3 is an elevational view of the motion control mechanism which controls the motions of the car body.
Figure 4:
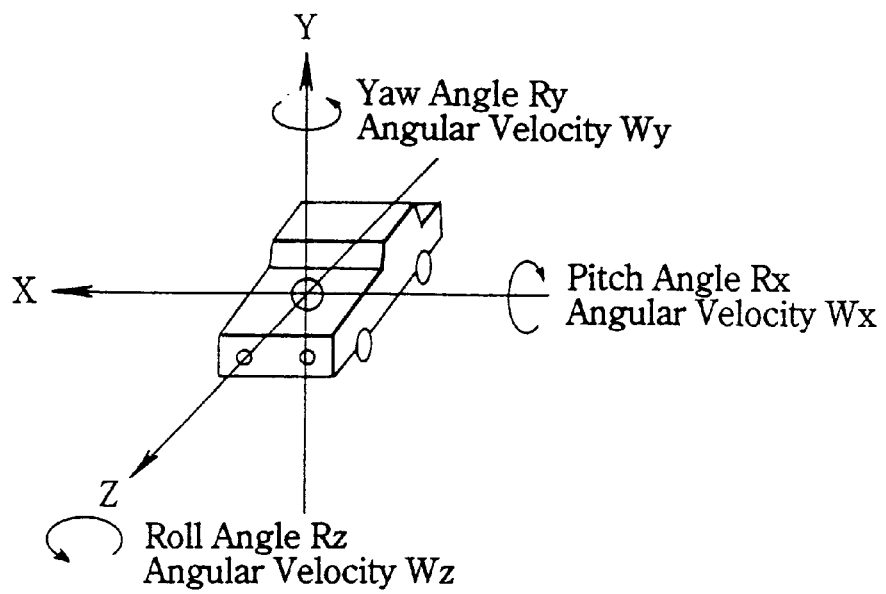
FIG. 4 explains the behavior of the car body along three axes.
Figure 5:
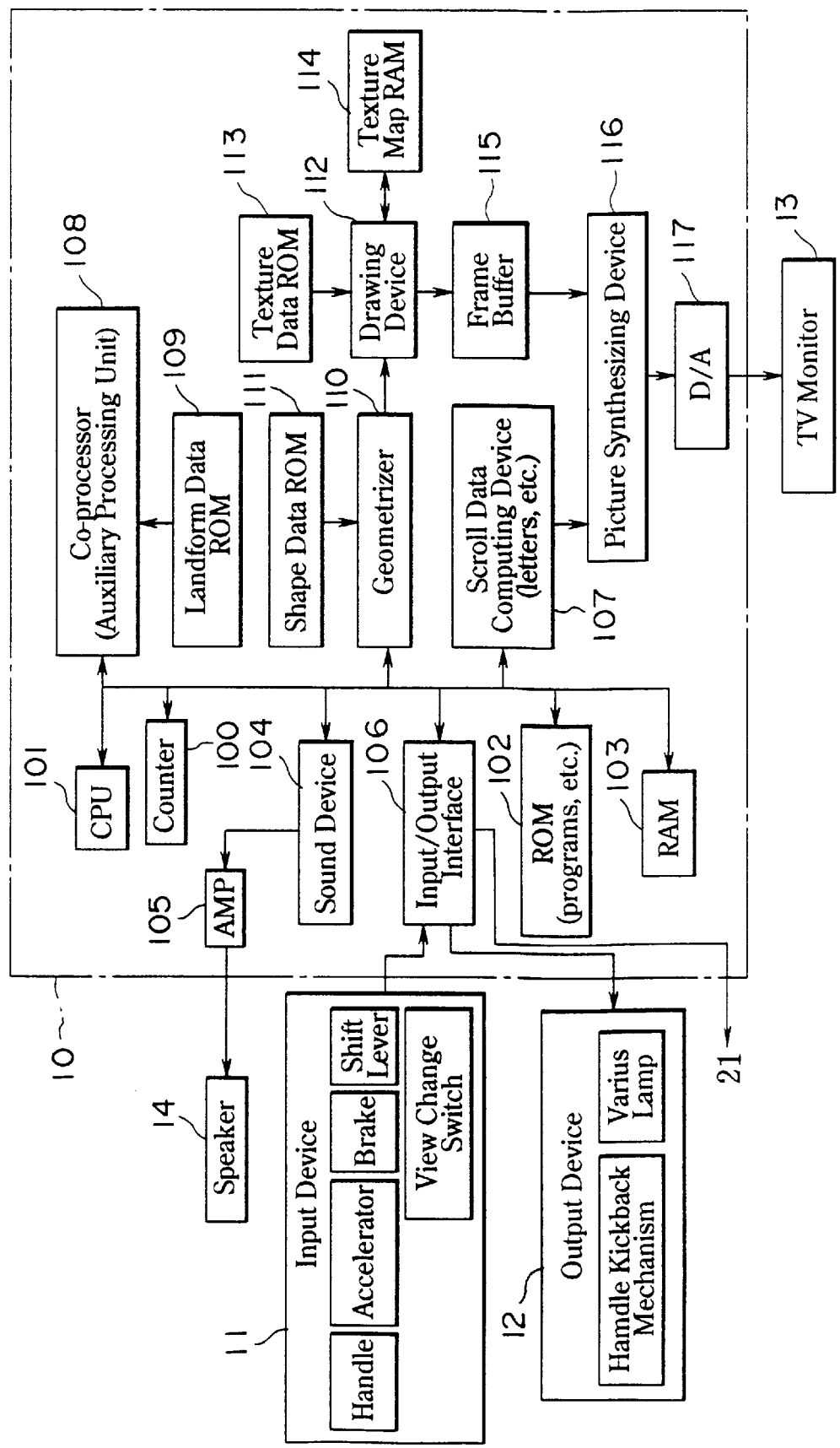
FIG. 5 is a block diagram of a construction example of a game device basic controller 10.

FIG. 1 is a block diagram showing a control system of a game device for a driving game in relation to the present invention. FIGS. 2 and 3 describe a dummy car operated by a game player and a motion driving mechanism which drives the dummy car. FIG. 4 explains forces applied to the car. FIG. 5 is a block diagram describing a construction example of a game device basic controller.

As shown in FIG. 1, the control system of this game device is divided broadly into a basic control system 2 and a motion control system 3. The basic control system 2 is responsible for the control of basic elements of the video game device and comprises a game device basic controller 10, an input device 11, an output device 12, a display device 13 such as a projector or a TV monitor, and a sound output device 14 such as a speaker. The motion control system 3 comprises: a motion base controller 21 for controlling a six-axial cylinders of a motion base in order to control the attitude and movement of a car body 1; a monitoring device 22 for displaying the control state; a keyboard 23 to be used by an operator to give indications to the controller 21; a digital-analog converter (DAC) 24 for converting a driving output from the motion base controller 21 into analog signals; a servo amplifier 31 for amplifying the power of an output from DAC 24 and adjusting the oil supply from a hydraulic power source pump accumulator 33; and an actuator 34 for setting a stroke of an arm with its one end connected to the car body by means of oil supplied from a servo valve 32. A position sensor (or pressure sensor) output from the hydraulic cylinder 34 as the actuator is fed back to the servo amplifier 31, thereby forming feedback control loops and enhancing the control precision.

As the actuator, it is possible to use, other than a hydraulic cylinder, a pneumatic cylinder, an electric servomotor, a hydraulic motor or the like.

As shown in FIGS. 2 and 3, the dummy car 1 is installed on an upper frame of a motion base (or motion control mechanism) 300 for moving the dummy car 1. In front of the car on the upper frame, a projector 13, a convex mirror 13a and a screen 13b are installed. Six hydraulic cylinders 34 (three of which can be seen in FIG. 3) are placed between the upper frame and the lower frame, so that the movement of the car 1 is simulated by so-called six-axial control.

As shown in FIG. 4, in addition to three forces in X, Y and Z axial directions, three other forces (pitch, yaw and roll) in directions of rotation of the respective axes are applied to the car body, so that the car body is controlled by means of six-axial control. Accordingly, six sets of DAC 24, servo amplifier 31, servo valve 32, hydraulic power source pump accumulator 33 and actuator 34 are used for the six-axial control, but only one set is shown in FIG. 1 for convenience of explanation. The servo valve 32, the hydraulic power source accumulator 33 and the actuator 34 can be made into an electric servo mechanism.

The input device 11 is installed within the car body 1 and has a handle, an accelerator, a brake, a shift lever, and a view change switch, and the output device 13 has a handle kickback mechanism and various kinds of lamps. The display device 13 displays a picture of a driving game and, as shown in FIG. 3, it is mounted on the car body 1 side so that it will correspond to the movement of the car. Instead of this projector, a TV monitor may be used. The view change switch is a switch for changing a viewpoint. Operation of this switch provides a player with, for example, a viewpoint from a driver's seat or a viewpoint showing the car as seen from the back side off to the right or left.

As shown in FIG. 5, the game device basic controller 10 has CPU (central processing unit) 101 and also comprises ROM 102, RAM 103, sound device 104, input/output interface 106, scroll data computing device 107, co-processor (auxiliary processing unit) 108, landform data ROM 109, geometrizer 11, shape data ROM 111, drawing device 112, texture data ROM 113, texture map RAM 114, frame buffer 115, picture synthesizing device 116 and D/A converter 117.

CPU 101 is connected via bus lines to ROM 102, which stores predetermined programs and the like, RAM 103 for storing data, the sound device 104, the input/output interface 106, the scroll data computing device 107, the co-processor 108 and the geometrizer 110. RAM 103 functions as RAM for the buffer, so various commands (including a command to display objects) to the geometrizer 110 are written thereon and a matrix at the time of conversion matrix computation is written thereon (as in scaling of a cloud of dust as described later).

The input/output interface 106 is connected to the input device 11 and the output device 12, thereby operation signals of a handle, etc. of the input device 11 are taken in CPU 101 as digital quantity and signals generated by CPU 101 and other elements can be outputted to the output device 12. These signals include various kinds of flag signals and are supplied to the motion base controller 21.

The sound device 104 is connected to a speaker 14 via a power amplifier 105, and sound signals generated by the sound device 104 are amplified and then given to the speaker 14 as the sound output device.

According to this embodiment, CPU 101 reads in, based on the program installed in ROM 102, operation signals from the input device 11 and landform data from the landform data ROM 109 or shape data (three-dimensional data of, for example, "objects such as the player's car and opponent cars" and "background such as roads, landform, sky, audience and structures") from the shape data ROM 111, and then performs at least car behavior computation (simulation), such as a determination of contact (or collision) between the landform and the car, behavior computation of four-wheel suspension, and a determination of collision between cars, as well as orbital computation such as a cloud of dust as special effect.

Car behavior computation is conducted to simulate the movements of the car in a virtual space in accordance with the operation signals sent by the player from the input device 11. After a coordinate value in a three-dimensional space is determined, a conversion matrix for converting this coordinate value into a visual field coordinate system and the shape data (such as cars and landform) are specified at the geometrizer 110. The landform data ROM 109 is connected to the co-processor 108 and, therefore, predetermined landform data are delivered to the co-processor 108 (and CPU 101). The co-processor 108 is designed mainly to make a determination of contact between the landform and the car and to assume mainly the operation of floating points during this determination and the car behavior computation. As a result, the co-processor 108 executes the determination of contact (or collision) between the car and the landform, and the determination results thereof are given to CPU 101, thereby reducing the computation load on CPU and enabling more rapid performance of this contact determination.

The geometrizer 110 is connected to the shape data ROM 111 and the drawing device 112. The shape data RON 111 has previously stored thereon the polygon shape data (three-dimensional data consisting of respective vertexes, such as cars, landform and background), and this shape data is delivered to the geometrizer 110. The geometrizer 110 radioscopically converts the shape data designated by a conversion matrix sent from CPU 101, thereby obtaining data converted from a coordinate system in a three-dimensional virtual space to a visual field coordinate system.

The drawing device 112 pastes textures onto the converted shape data of the visual field coordinate system, and outputs such data to the frame buffer 115. In order to paste the textures, the drawing device 112 is connected to the texture data ROM 113 and the texture map RAM 114, and also to the frame buffer 115. Polygon data means a group of data of relative or absolute coordinates of respective vertexes of polygons (polygons: mainly triangles or quadrangles) which are made of an aggregate of a plurality of vertexes. The landform data ROM 109 stores polygon data which are set comparatively rough to satisfy the performance of the determination of contact between the car and the landform. In contrast, the shape data ROM 111 stores polygon data set in more details with regard to shapes, such as cars and background, which compose the screen.

The scroll data computing device 107 computes scroll picture data such as letters. This computing device 107 and the above-mentioned frame buffer 115 are connected to the picture synthesizing device 116 and the D/A converter 117 and then to the display device 13. This allows a polygon picture (simulation results), including the car and landform (background), which is temporarily stored in the frame buffer 115, and a scroll picture with letter information such as a speed value and lap time, to be synthesized in accordance with a designated priority, thereby generating a final frame picture data. This picture data is converted by the D/A converter 117 into analog signals and sent to the display device 13, and the picture of the driving game is displayed on a real-time basis.

Figure 6:
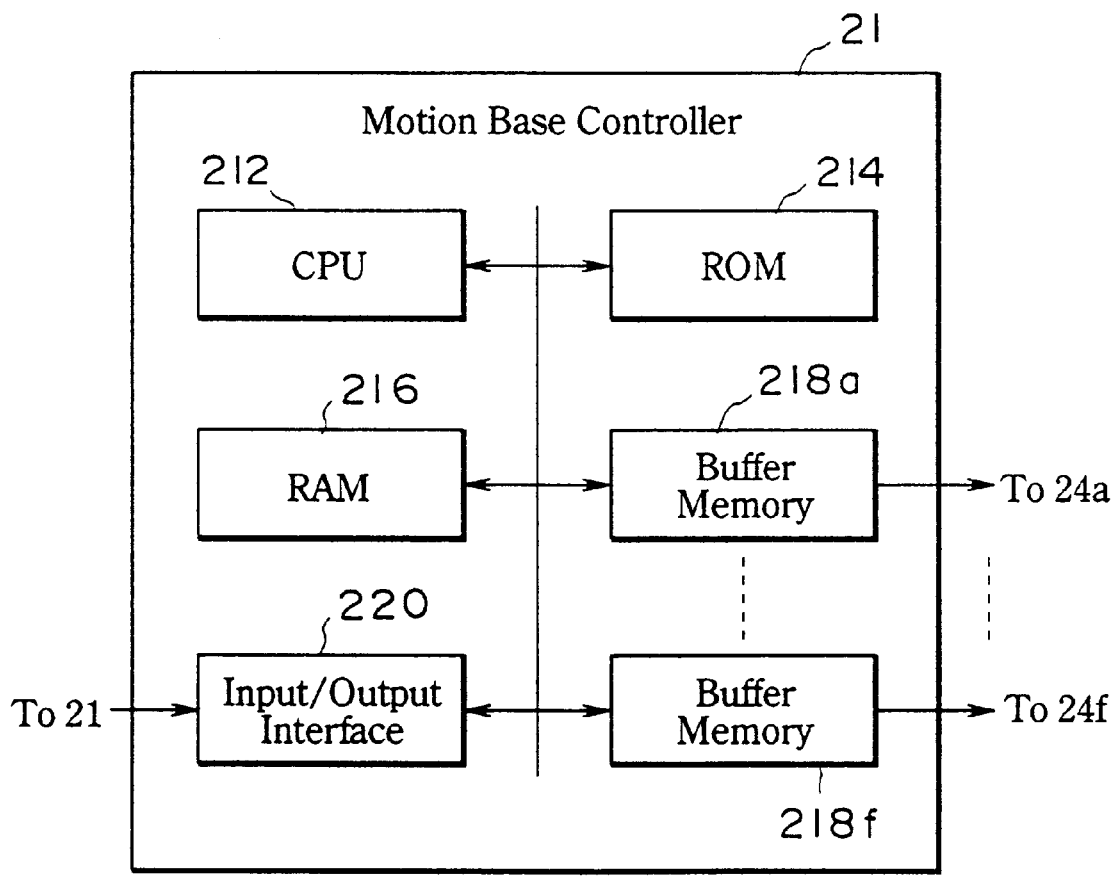
FIG. 6 is a block diagram of a construction example of a motion base controller 21.

The motion base controller 21 is hereinafter explained by referring to FIGS. 6 through 13(d). As shown in FIG. 6, the motion base controller 21 is constructed by comprising: CPU 212 for conducting arithmetic processing to control six cylinders; ROM 214 for storing a control program of CPU 212 and a motion table described later; RAM 216 for retaining various kinds of flag information and control parameters and for serving as a data processing area; an input/output interface 220 for conducting communication between the game device basic controller 10 and the motion controller 21 and for receiving flag signals, etc.; and buffer memories 218a through 218f, each for temporarily retaining data for six sets of DAC.

FIG. 7 shows an example of a motion table stored in ROM 214. This table stores a group of actuator control data to be executed in accordance with code signals sent from the game device basic controller 10. For example, a code "A00" corresponds to a flag signal "ACC L" which is a series of data meaning large acceleration and which has a length equal to 180 frames of pictures. A code "B00" corresponds to a flag signal "F BAN L" in which a series of data in the case of a large collision at the front portion of the car body is stored for time equal to 60 frames. For convenience, codes "A00" through "A12" which mainly relate to the attitude control and movements of the car body will be referred to as Table A, codes "B00" through "B06" which mainly relate to exterior disturbing factors such as collisions will be referred to as Table B, and a code "C00" which relates to vibrations caused by conditions of a road surface will be referred to as Table C. Each table normally contains, without limitation, combinations of flags which don not coexist.

Figure 8:
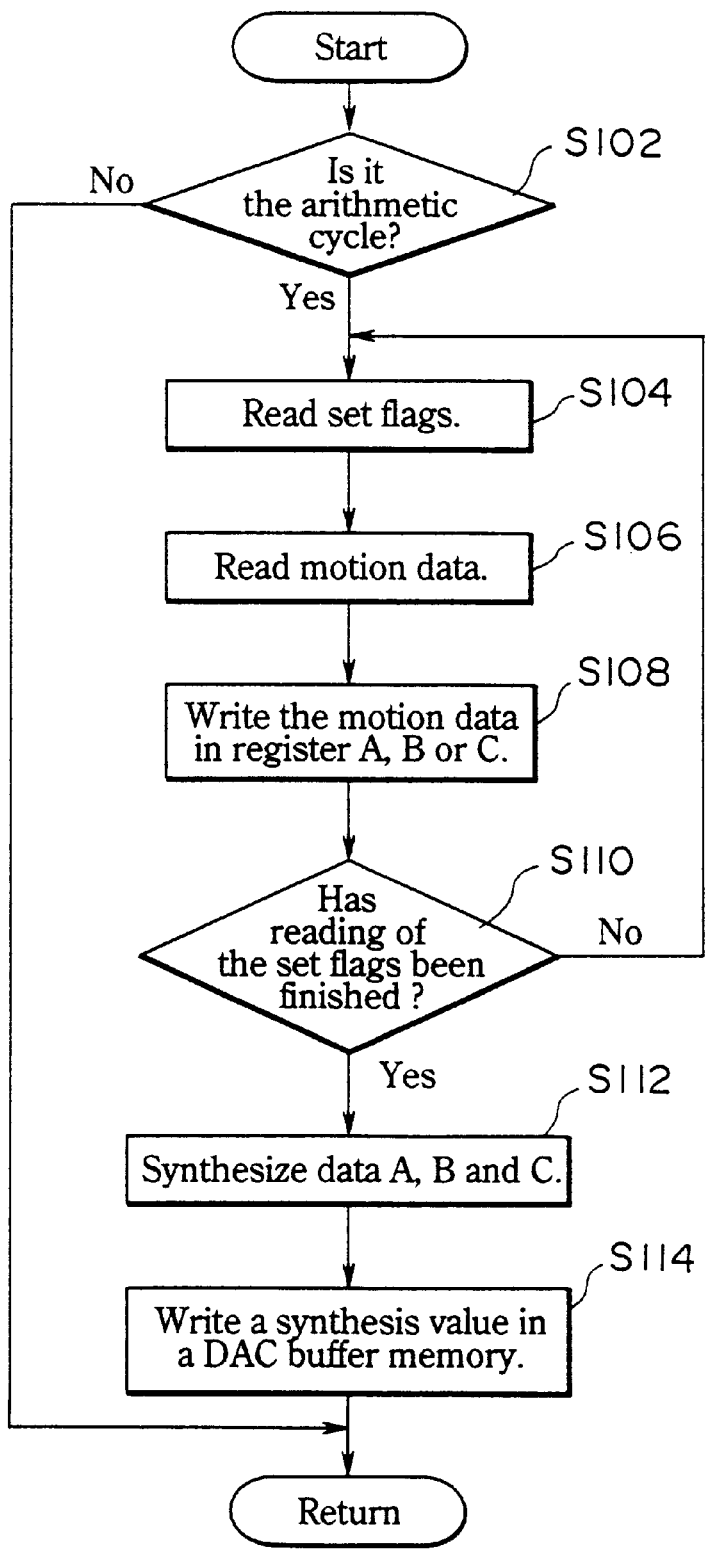
FIG. 8 is a flowchart which explains an arithmetic processing performed by CPU 212 of the motion controller.
Figure 9:
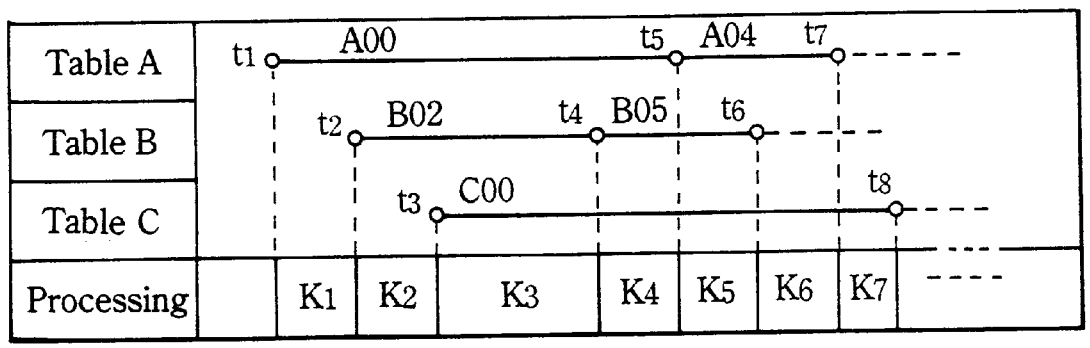
FIG. 9 explains an arithmetic processing performed by CPU in accordance with the generation of flags during a game.
Figure 11:
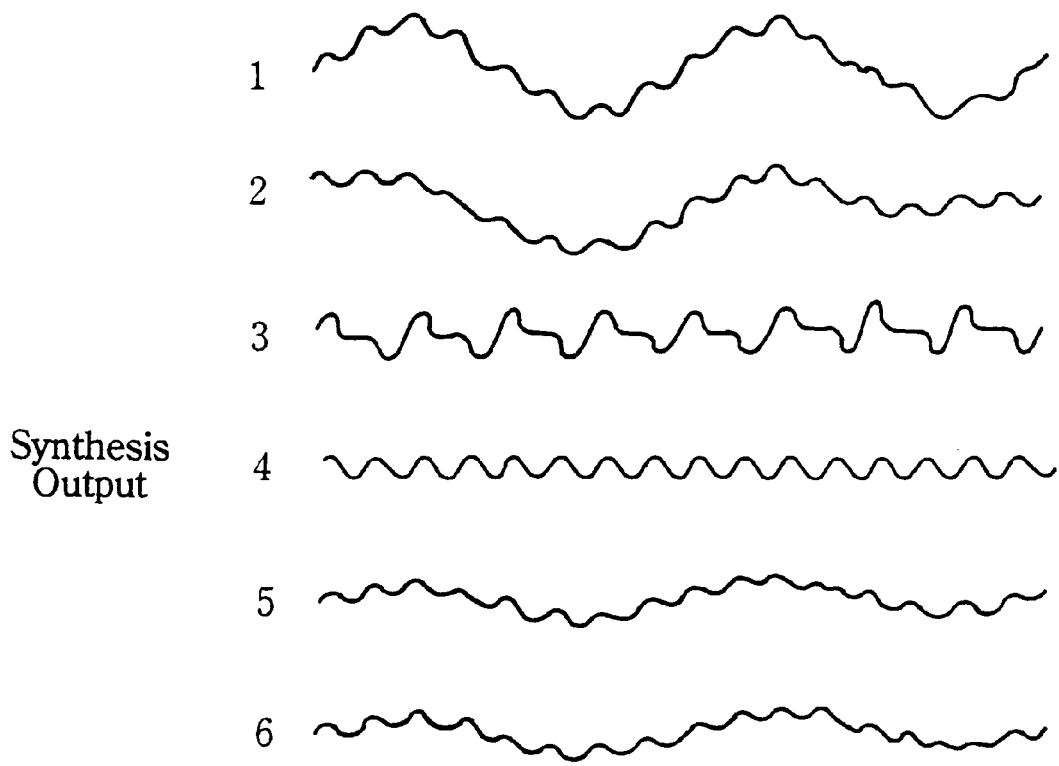
FIG. 11 shows examples of synthesis of actuator data.
Figure 12A:
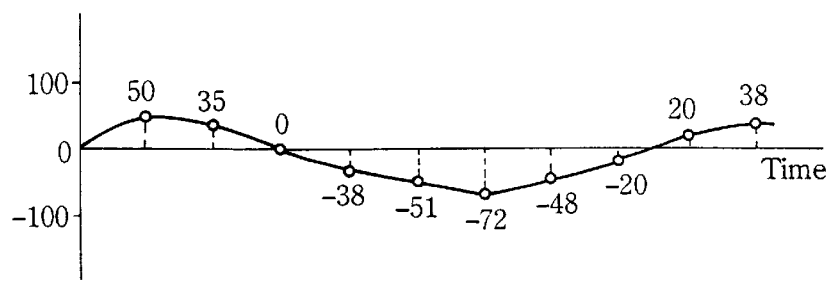
FIGS. 12(a)–12(c) show examples of data synthesis.
Figure 12B:
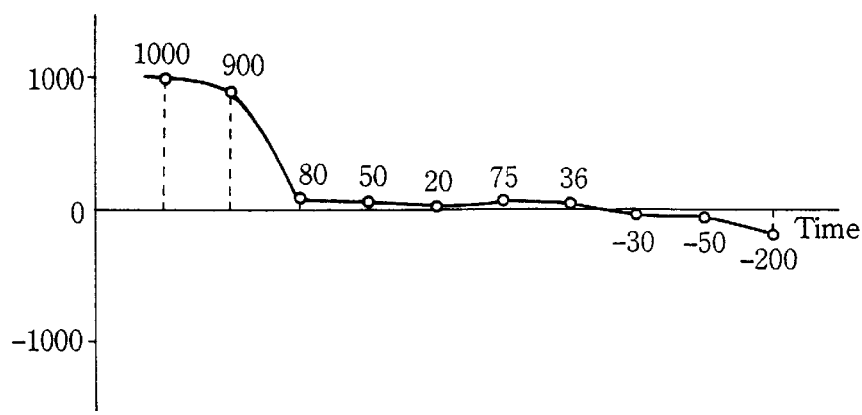
Figure 12C:
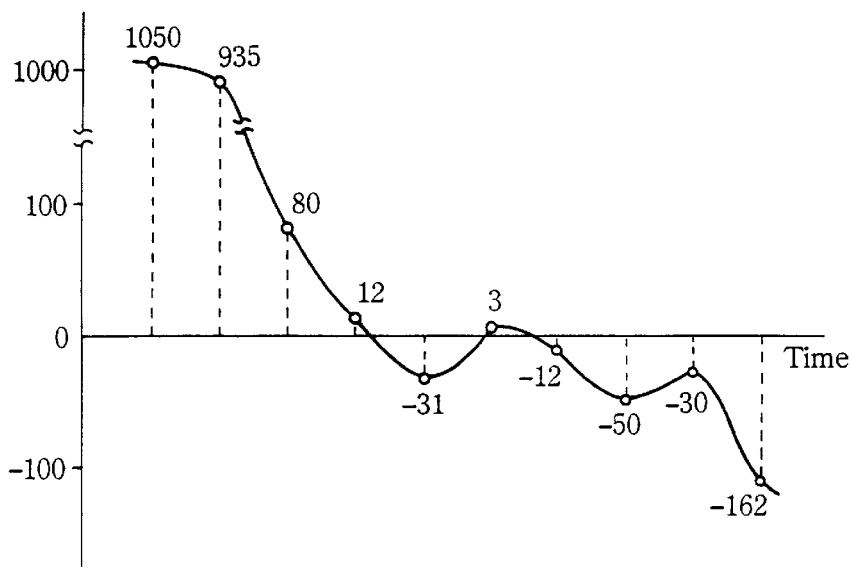

A control action of CPU 212 is hereinafter explained by referring to FIGS. 8 through 12. FIG. 8 is a flowchart showing one example of a control embodiment of CPU 212. FIG. 9 explains the processing of CPU 212 corresponding to coexisting flags. FIGS. 10(a)–10(c) and 11 explain examples of synthesis of control data corresponding to flags A00, B02 and C03. FIGS. 12(a)–12(c) explain examples of synthesis of control data with respect to one axis.

According to the start, progress, development, etc. of a game, flag signals are sent from the game device basic controller 10 to the motion base controller and are then sequentially written in RAM 216 at predetermined storage positions. The written flag signals are retained for a period of time (or number of frames) which is set by a timer program (not shown) in accordance with each flag signal.

For example, as a driver starts a car and rapidly accelerates and drives it, the left side of the car collides with some object such as a sidewall. As the driver keeps accelerating the car, the car runs into a road in bad condition and a road noise is produced and the right side of the car collides with some object, and so on. The car sideslips and turns a left corner. A game will develop in this way. In this case, as shown in FIG. 9, flags A00, A04, B02, B05, C00 and other flags occur and are retained for a predetermined period of time corresponding to the number of frames as determined concerning each flag data. The timer program is capable of indicating an elapsed time (the number of elapsed frames) from the set point of each flag, thereby offering a convenience to read the control data which are assigned to the respective frames and are stored.

As shown in FIG. 8, CPU 212 reads a flag which has been set in RAM for each predetermined arithmetic cycle, for example, each frame cycle (1/60 seconds) of a game screen (S102). For example, when a flag "A00" is set at time t1, this flag is read (S104) and data of a first frame of the flag "A00" (ACC L) is read from a motion table list of ROM 214 (S106).

FIG. 10(a) shows data values of "A00" in chronological order. Six kinds of data are prepared for actuators 1 through 6 in accordance with the six-axial control. First frame values of such data are taken in registers A1 through A6 (not shown) within CPU (S108). It is confirmed whether or not other flags are set (S110). Since there is no flag other than "A00" at time t1, processing K1 (S112) is to write the values in the registers A1 through A6 in DAC buffer memories 218a through 218f respectively without changes (S114). The buffer memory 218a retains the data of the actuator 1, the buffer memory 218b retains the data of the actuator 2, the buffer memory 218c retains the data of the actuator 3, the buffer memory 218d retains the data of the actuator 4, the buffer memory 218e retains the data of the actuator 5, and the buffer memory 218f retains the data of the actuator 6. These data are respectively supplied to DAC 24 for each axis (or actuator). FIG. 1 shows only one set of actuator system. CPU 212 repeats the above-described processing until time t2 in predetermined arithmetic cycles.

At time t2, as shown in FIG. 9, a flag "B02" (flag name "L BAN L") which represents a collision on the left side of the car is set (S102). Data of the flag "B02" is control data for 60 frames with regard to the actuators 1 through 6. FIG. 10(b) shows an example of control data of a lake. CPU 212 reads data for six axes about a frame at time t2 concerning the flag "A00" into the registers A1 through A6 (S104 through S108) and also reads data for six axes about a first frame concerning the flag "B02" into registers B1 through B6 (S104 through S108). Since there are no flags other than "A00" or "B02" at time t2 (S110), synthesis processing K2 is conducted with regard to data A and B. Namely, data of the actuators 1 through 6 concerning the relevant frame of "A00" at time t2 is written in the registers A1 through A6 by referring to the timer. Data of the actuators 1 through 6 concerning the first frame of "B02" is written in the registers B1 through B6. The registers A1 and B1, the registers A2 and B2, the registers A3 and B3, the registers A4 and B4, the registers A5 and B5, and the registers A6 and B6 are respectively added (S112) and the results of addition are written in the buffer memories 218a through 218f (S114). This processing is repeated until time t3 in predetermined cycles.

At time t3, a flag "C00" is set in addition to the flags "A00" and "B02." The flag "C00" means road noise. FIG. 10(c) shows an example of data for six axes of the actuators 1 through 6, which is the control data of the flag "C00."

CPU 212 reads data for six axes about a frame at time t3 concerning the flag "A00" from ROM 214 into the registers A1 through A6 (S104 through S108), reads data for six axes about a frame at time t3 concerning the flag "B02" into the registers B1 through B6, and also reads data for six axes about a first frame concerning the flag "C00" into registers C1 through C6 (S104 through S110). Since the flags "A00," "B00" and "C00" exist at time t3 (S110), synthesis processing K3 is conducted with regard to data A, B and C. For the purpose of synthesizing the data, the registers A1, B1 and C1, the registers A2, B2 and C2, the registers A3, B3 and C3, the registers A4, B4 and C4, the registers A5, B5 and C5, and the registers A6, B6 and C6 are respectively added and six-axial outputs are synthesized (S112). FIG. 11 shows in chronological order an example of data synthesis outputs of the actuators 1 through 6 for the flags "A00," "B02" and "C03." Synthesis results are written in the buffer memories 218a through 218f (S114). CPU 212 repeats the processing K3 until time t4.

CPU repeats the above-described processing and conducts the processing K4 from time t4 to time t5, the processing K5 from time t5 to time t6, the processing K6 from time t6 to time t7, and the processing K7 from time t7 to time t8.

FIGS. 12(a) through 12(c) explain examples of actuator data synthesis concerning one axis. Corresponding to the arm length of the actuator, which is expressed by 12 bits, a dynamic range of signals is expressed within a range from +2047 to −2047 (12 bits). For example, FIG. 12(a) shows data of the actuator 1 for any one of flags in Table A, FIG. 12(b) shows data of the actuator 1 of any one of flags in Table B, and FIG. 12(c) shows synthesized data of the actuator 1. In each figure, as a signal amplitude difference is large, the unit of a vertical axis is expressed in an abbreviated manner.

Figure 13A:
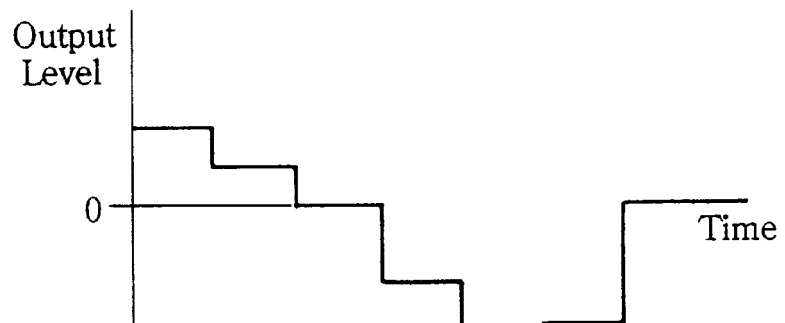
FIGS. 13(a)–13(d) show examples of signal smoothing.
Figure 13B:
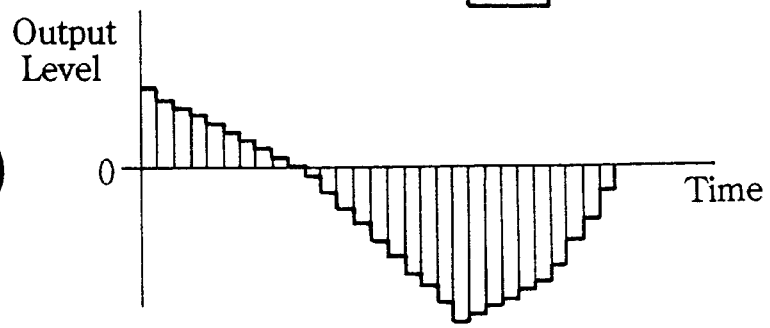
Figure 13C:
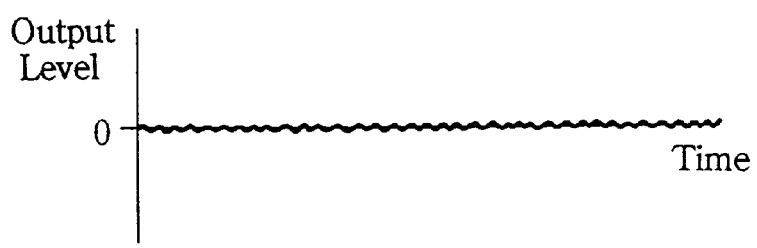
Figure 13D:
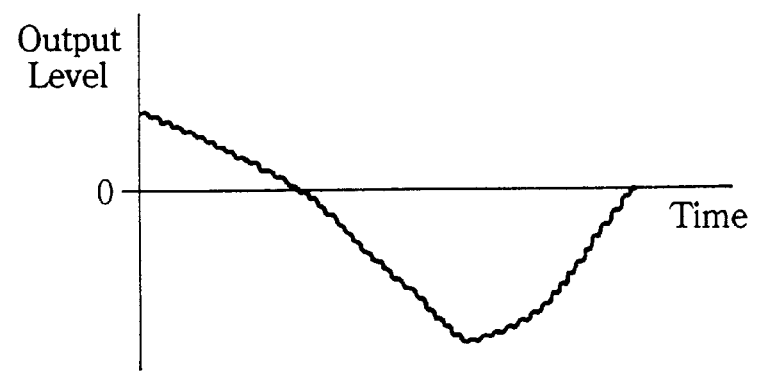

FIGS. 13(a)–13(d) show that smoothing is conducted when signals are read in a predetermined arithmetic cycle of signal smoothing at DAC 24 and converted into analog signals. Namely, data which is outputted in a predetermined arithmetic cycle as shown in FIG. 13(a) becomes subject to linear interpolation as shown in FIG. 13(b). Dither signals which are sinusoidal waves of hundreds of hertz are superposed over the above-described interpolated data, as shown in FIG. 13(c) thereby smoothing a signal waveform. Of course, it is possible to conduct signal smoothing by using a low pass filter. As mentioned above, outputs from DAC 24 are supplied to the servo amplifier 31.

Figure 14:
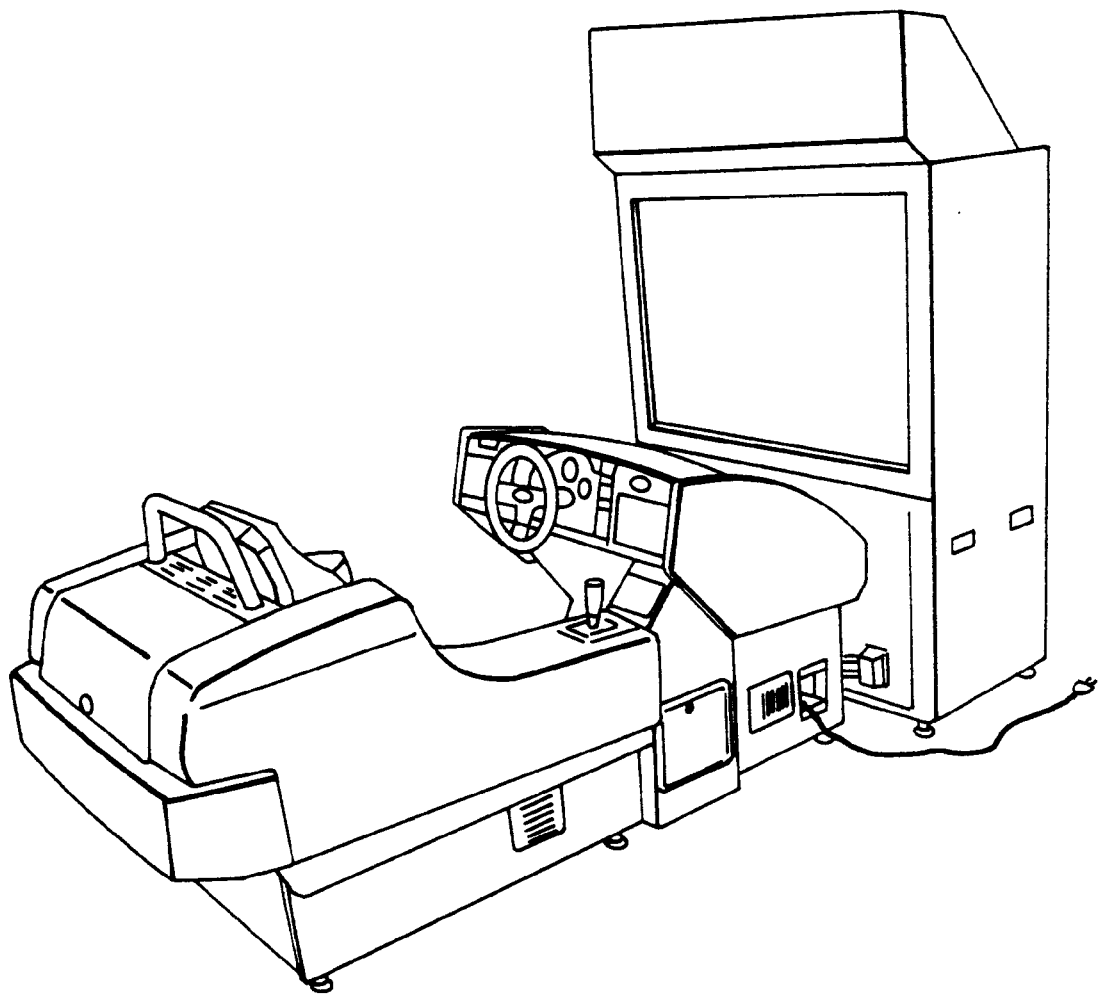
FIG. 14 shows an application example to another car body.

FIG. 14 shows an example in which a car body 1 and a projector 13 are separately composed. In this example, the car body 1 and the motion base mechanism for moving the car body are composed more simply. Even with such a construction, it is possible to enjoy a more realistic driving game with a good response by adopting the aforementioned method of acknowledging the coexistence of flags, synthesizing actuator data of plural flags, and using the synthesized data.

Figure 15A:
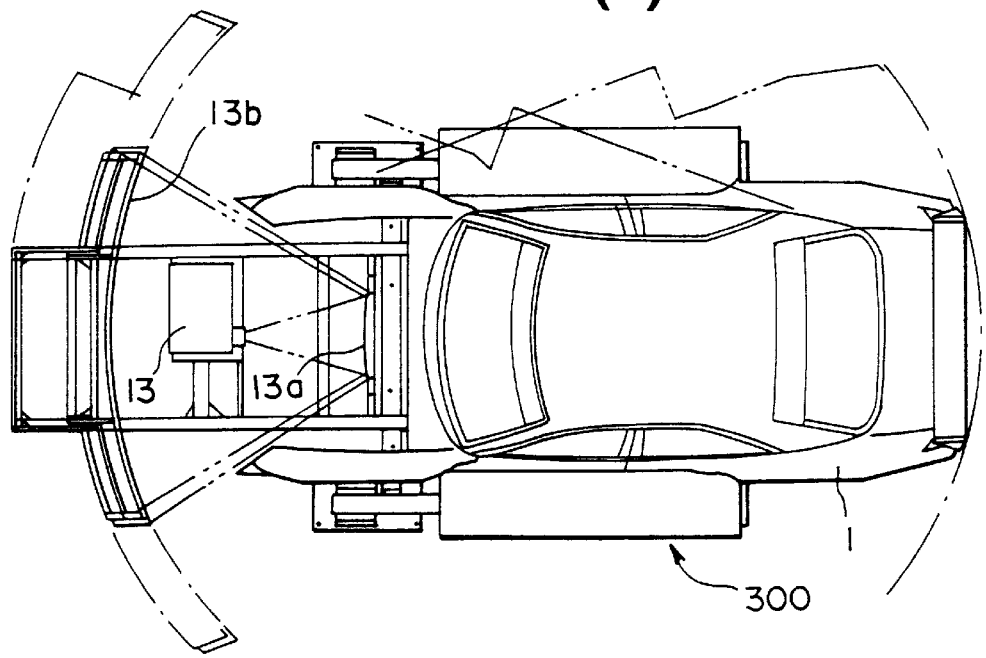
FIGS. 15(a)–15(c) show an example of another motion control mechanism which controls the motions of a car body.
Figure 15B:
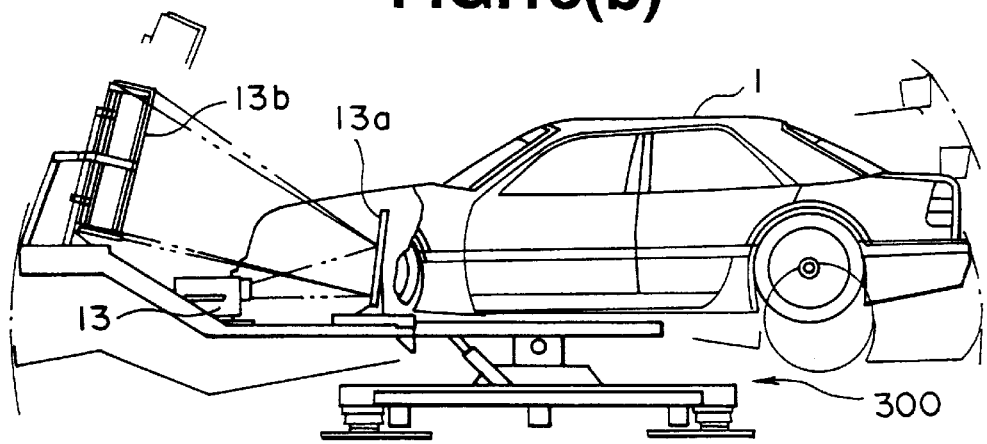
Figure 15C:
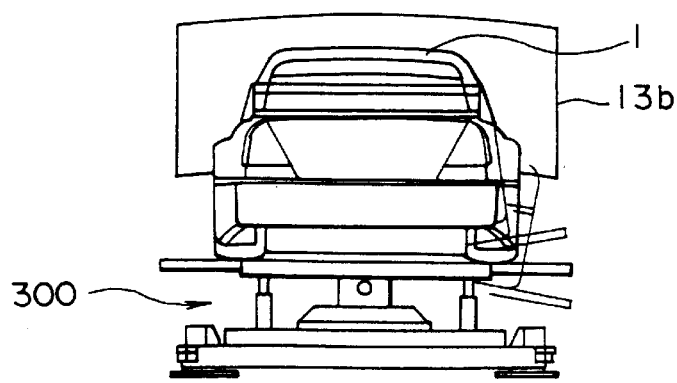

FIGS. 15(a)–15(c) explain an example of the movement control of a dummy car by means of another motion base. FIG. 15(a) is a top view, FIG. 15(b) is a front view, and FIG. 15(c) is a right side view.

In these figures, a car body 1 is installed on an upper frame of a motion base 300. In front of the car body on the top frame, a projector 13, a convex mirror 13a and a screen 13b are installed.

Figure 16A:
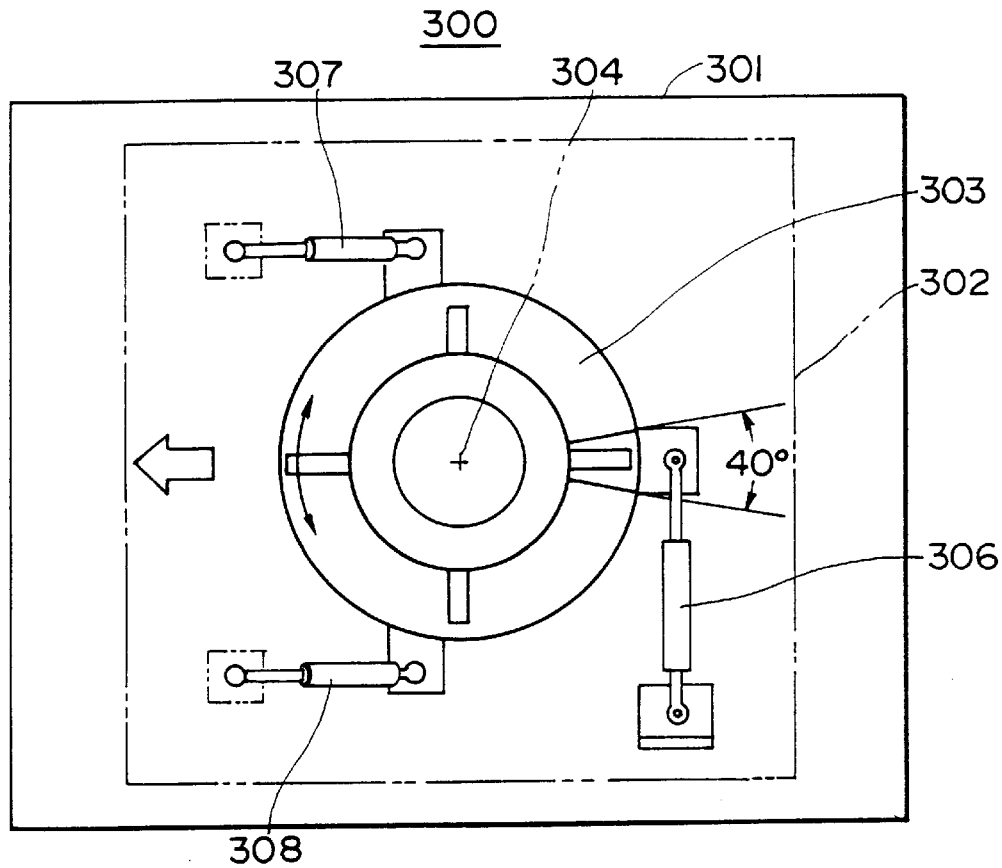
FIGS. 16(a)–16(c) show a motion base 300 of the motion control mechanism shown in FIGS. 15(a)–15(c).
Figure 16B:
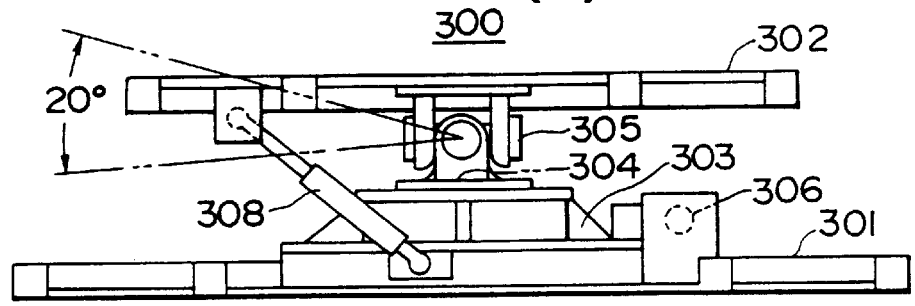
Figure 16C:
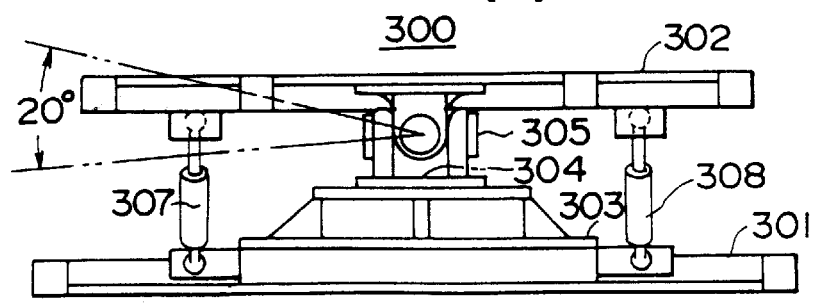
Figure 17:
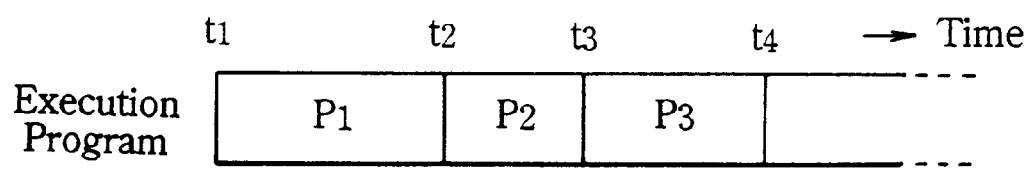
FIG. 17 shows a conventional example of execution of a program for controlling the motions of a car body.

FIGS. 16(a)–16(c) schematically show the construction of the motion base 300. FIG. 16(a) is a top view, FIG. 16(b) is a front view and FIG. 16(c) is a left side view.

In each view of FIGS. 16(a)–16(c), reference numeral 301 indicates a lower frame which serves as a base. Reference numeral 302 indicates an upper frame on which the car body 1 and other elements are installed. Reference numeral 303 indicates a yaw rotary ring. Reference numeral 304 indicates a rotary core of the rotary ring 303. Reference numeral 305 indicates a universal joint which connects the rotary core 304 of the rotary ring 303 to the upper frame 302 in a freely shakable (or rotatable) manner. Reference numeral 306 indicates a yawing hydraulic cylinder for rotating the yaw rotary ring 303. Reference numeral 307 and 308 indicate roll and pitching hydraulic cylinders which give roll (right and left swinging) and pitch (back and forth swinging) movements to the upper frame 302. A rotary ring bearing inside the yaw rotary ring 303 retains the yaw rotary ring 303 at the lower frame 301 in a freely rotatable manner on its rotary core 304. Both ends of each hydraulic cylinder are supported by spherical bearings in a freely rotatable manner.

Of six kinds of movements of the car as shown in FIG. 4, this motion base 300 simulates the roll, pitch and yaw movements. As the hydraulic cylinder 306 is activated, the yaw rotary ring 303 is rotated, causing the universal joint and then the upper frame 302 to rotate. As described before, the dummy car 1, the projector 13, etc. are installed on the upper frame 302. For example, it is possible to rotate the car 1 on a horizontal plane within a range of 40 degrees turning angle by means of the hydraulic cylinder 306. By expanding and contracting the hydraulic cylinders 307 and 308 respectively in the same amount, it is possible, for example, to give the pitch movement to the car 1 within a range of 20 degrees with the X axis being the center of rotation. By giving a difference of expansion and contraction between the hydraulic cylinders 307 and 308, it is possible, for example, to give the roll movement to the car 1 within a range of 20 degrees with the Z axis being the center of rotation. Each hydraulic cylinder can be driven by the control system in the construction shown in FIG. 1.

In this example of the motion base, the movements in the X, Y and Z-axial directions of the motion base in the six-axial control as shown in FIG. 3 are omitted. For example, in the case of a road race of cars, since there are less up-and-down movements of a car as compared with a rally, etc., it is possible to give a sufficiently realistic excitement to a game player with the roll, pitch and yaw movements.

According to the constructions shown in FIGS. 15(a)–15(c), since the car 1 is not moved in up-and-down directions or right-and-left directions, it is possible to cut down the installment space sharply as compared with the case of the motion base of the six-axial control type as shown in FIG. 3. Particularly, as it is possible to reduce the space in up-and-down and right-and-left directions, such a game device can be settled at normal amusement facilities. Moreover, as the number of control factors (or cylinders) decreases, it is possible to simplify the control algorithm. As the number of the hydraulic cylinders decreases to half, the device construction becomes inexpensive.

As described above, according to the embodiments of this invention, it is possible to appropriately synthesizing a plurality of control data in which patterns of movements of the car by means of the actuators are determined and to execute such data as one control data. Accordingly, it is possible to allow a plurality of flags to occur for one event, thereby making it possible to reproduce detailed movements of the car more realistically by using the control data concerning plural movements. Moreover, when a plurality of flags or a plurality of control data coexist, the control data are synthesized sequentially and are outputted. Therefore, it is possible to conform quickly to continuous occurrence of events. Furthermore, since the control data to be previously stored can be designed to, for example, emphasize the movements of the car so that movements of the car will be made amusing as a game, it is possible to obtain an entertaining game device as compared with a real-time simulation device concerning which an attempt is made to closely reproduce the movements of a real object.

Moreover, by introducing a program for performing the above-described control into a computer system, it is possible to make it function as a simulation game device of this invention. Such a program can be saved on an information storage medium such as a floppy disk, MD, photoelectromagnetic disk, ROM, CD-ROM, or communication network.

In the example of data processing as shown in FIG. 8, the storage places A1 through A6, B1 through B6 and C1 through C6 are secured for convenience of explanation, but there are no limitations. For example, it is possible to decide to conduct a convolution operation and to find a synthesis value by sequentially adding and deducting data which have been taken in. In this case, it is possible to reduce the number of storage places for data which CPU should secure for the operation. Moreover, it is possible to conduct the processing of addition and deduction by using, for example, so-called stack registers.

As a further developed example of this invention, the control may be conducted to synthesize flag data about sounds to be produced from a speaker along with the development of a game on the screen, or the amount of kickback to the handle kickback mechanism as the output device may be controlled.

Furthermore, although explanations are given in the above-described embodiments on the premise that the content of the game is a driving game, a dummy body to be moved may be a two-wheel motorcycle, ship, aircraft or the like and the above-described embodiments can be similarly applied by determining a plurality of appropriate control data concerning behavior of such dummy body.

As explained above, with the game device of this invention and by the method of controlling the game device of this invention, the processing of plural flags is not an individual serial processing, but a plurality of flag data are processed simultaneously by synthesizing data which correspond to the coexisting flags. Accordingly, the movements of a dummy body(or object) such as a car conform to the occurrence of events. Moreover, since a plurality of movements are synthesized, behavior of the dummy body can be expressed in more detail than in conventional cases. Therefore, it is possible to enjoy a more realistic simulation game. Furthermore, since the data in which patterns of movements are previously determined are used, the amount of operation which CPU bears is less than that of a real-time simulation and, therefore, it is preferable to apply this invention to a game device which requires a low cost.

According to the motion control mechanism of this invention, it is possible to install a game simulator such as a car in a comparatively small space.

What is claimed is:

1. A game device, comprising:
    a vehicle simulator for an operator to ride and drive;
    a motion control mechanism for moving said vehicle simulator;
    a storage means for retaining a plurality of control data for moving said vehicle simulator in various patterns by assigning the control data respectively to a plurality of flag signals;
    a basic control means for setting a flag signal which corresponds to an event occurring in accordance with the development of a game by said operator; and
    a motion control means for reading from said storage means the control data corresponding to said flag signal which has been set, and for giving the control data to said motion control mechanism,
    wherein said motion control means, upon the coexistence of said flag signals, synthesizes a plurality of control data, which correspond to the respective flag signals, and gives the synthesized control data to said motion control mechanism.

2. A game device according to claim 1, wherein said control data are divided into a plurality of groups and one control data is selected from one group.

3. A game device according to claim 2, wherein one group of said plurality of groups is control data which expresses movements of said vehicle simulator as it is driven, and another group is control data which expresses a collision with said vehicle simulator.

4. A gave device according to claim 1, wherein said motion control mechanism has a plurality of actuators for driving said vehicle simulator and said plurality of synthesized control data respectively correspond to said plurality of actuators.

5. A game device according to claim 1, wherein said motion control mechanism repeats, in predetermined cycles, the reading of said control data and the synthesis of said control data.

6. A method of controlling a control device for controlling the movements of a vehicle simulator with a situation game device designed to allow an operator to ride the vehicle simulator and to drive said vehicle simulator in accordance with a story developed on a screen and to control the movements of said vehicle simulator on the basis of the drive by said operator and the development of said story, comprising
    selecting control data corresponding to an event from a plurality of various control data with determined patterns for moving said vehicle simulator and transmitting said control data to said control device, every time said event occurs in accordance with the development of said story; and
    synthesizing said control data with at least a second control data and obtaining a synthesized control data and providing said synthesized control data to said control device, if a plurality of said events occur and if a plurality of the control data to be given to said control device exist simultaneously.

7. A method according to claim 6, wherein synthesizing further includes expressing each of said control data with a corresponding data length, which can be expressed on a time axis set for individual control data, and is located on a time axis for arithmetic processing in accordance with the occurrence of said event, and providing a synthesized control data representative of each said control data existing on said time axis at the same time,
    when a plurality of said control data are located on said time axis, at the same time.

8. A motion control mechanism, comprising:
    an upper frame and a lower frame, respectively located at an upper position and a lower position so as to be in parallel to each other;
    a rotary ring mounted on said lower frame and being rotatable on a rotary core which is an axis perpendicular to a principal plane of said lower frame;
    a universal joint for supporting said upper frame in a freely shakable manner, said universal joint being mounted between a nearly central portion of said rotary ring and said upper frame;
    a first actuator for rotating said rotary ring, said first actuator being mounted between said rotary ring and said lower frame; and
    second and third actuators respectively mounted between said rotary ring and said upper frame so as to hold said rotary core in between.

9. A motion control mechanism according to claim 8, wherein said first actuator gives a yaw motion to said upper frame, and said second and third actuators give a roll and pitch motion to said upper frame.

10. A motion control mechanism according to claim 8, wherein said actuator is any one of a hydraulic cylinder, a pneumatic cylinder and a servomotor.

11. A computer readable medium containing computer software which, when run on a computer, causes the computer to provide a game device, comprising
    means for moving a vehicle simulator permitting an operator to ride and drive said vehicle simulator;
    means for storing a plurality of control data for moving said vehicle simulator in various patterns by assigning the control data respectively to a plurality of flag signals;
    means for setting a flag signal which corresponds to an event occurring in accordance with the development of a game by said operator; and
    means for reading from said means for storing the control data corresponding to said flag signal which has been set, and for giving the control data to said means for moving,
    wherein said means for reading, upon the coexistence of said flag signals, synthesizes a plurality of control data, which correspond to the respective flag signals, and gives the synthesized control data to said means for moving.

12. A computer readable medium containing computer software which, when run on a computer, causes the computer to provide apparatus for controlling a control device for controlling the movements of a vehicle simulator with a situation game device designed to allow an operator to ride the vehicle simulator and to drive said vehicle simulator in accordance with a story developed on a screen and to control the movements of said vehicle simulator on the basis of the drive by said operator and the development of said story, comprising selecting control data corresponding to an event from a plurality of various control data with determined patterns for moving said vehicle simulator and transmitting said control data to said control device, every time said event occurs in accordance with the development of said story; and synthesizing said control data with at least a second control data and obtaining a synthesized control data and providing said synthesized control data to said control device, if a plurality of said events occur and if a plurality of the control data to be given to said control device exist simultaneously.

* * * * *